United States Patent
Mueckl et al.

(10) Patent No.: US 11,946,736 B2
(45) Date of Patent: Apr. 2, 2024

(54) MOTORIZED TAPE MEASURE

(71) Applicant: Milwaukee Electric Tool Corporation, Brookfield, WI (US)

(72) Inventors: Gareth J. Mueckl, Milwaukee, WI (US); Scott Earl McKinster, Watertown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/930,604

(22) Filed: Sep. 8, 2022

(65) Prior Publication Data

US 2023/0003499 A1 Jan. 5, 2023

Related U.S. Application Data

(63) Continuation of application No. 17/122,764, filed on Dec. 15, 2020, now Pat. No. 11,466,969, which is a continuation of application No. PCT/US2020/037247, filed on Jun. 11, 2020.

(60) Provisional application No. 62/861,710, filed on Jun. 14, 2019.

(51) Int. Cl.
  *G01B 3/10* (2020.01)
  *G01B 3/1005* (2020.01)

(52) U.S. Cl.
  CPC .... *G01B 3/1005* (2013.01); *G01B 2003/1028* (2013.01); *G01B 2003/103* (2013.01)

(58) Field of Classification Search
  CPC ... G01B 3/1005; G01B 3/1061; G01B 3/1069
  USPC .......................................... 33/760, 762, 763
  See application file for complete search history.

(56) References Cited

U.S. PATENT DOCUMENTS

| | | |
|---|---|---|
| 2,543,176 A | 2/1951 | Komassa |
| 2,833,534 A | 5/1958 | Foster |
| 2,869,801 A | 1/1959 | Foster |
| 2,997,251 A | 8/1961 | Chafin |
| 3,033,316 A | 5/1962 | Foster |
| 3,473,751 A | 10/1969 | Quenot |
| 3,680,214 A | 8/1972 | Quenot |
| 3,705,962 A | 12/1972 | Banister |

(Continued)

FOREIGN PATENT DOCUMENTS

| | | |
|---|---|---|
| CN | 2672613 Y | 1/2005 |
| CN | 100460819 C | 2/2009 |

(Continued)

OTHER PUBLICATIONS

International Search Report and Written Opinion for International Application No. PCT/US2020/037247, dated Sep. 17, 2020, 14 pages.

*Primary Examiner* — George B Bennett

(74) *Attorney, Agent, or Firm* — Reinhart Boerner Van Deuren s.c.

(57) ABSTRACT

Various aspects of tape measures with one or more of a sensor, a motor, and a clutch, are shown. The sensors described herein detect, through various mechanisms, the position of the retraction system of a tape measure. The measurements by the sensors may be used to control a motor to adjust an amount of tension in the spiral spring of a tape measure. In various embodiments a motor interacts with the retraction system of the tape measure via a clutch, which moderates an amount of force that the motor can communicate to the retraction system.

20 Claims, 14 Drawing Sheets

(56) References Cited

U.S. PATENT DOCUMENTS

| | | | |
|---|---|---|---|
| 4,057,904 | A | 11/1977 | Vrabel |
| 4,171,109 | A | 10/1979 | Roe |
| 4,186,490 | A | 2/1980 | Mabo |
| 4,189,107 | A | 2/1980 | Mabo |
| 4,207,770 | A | 6/1980 | Grushow |
| 4,352,244 | A | 10/1982 | Tomuro |
| 4,506,446 | A | 3/1985 | Mitchell |
| 4,527,334 | A | 7/1985 | Jones |
| 4,551,847 | A | 11/1985 | Caldwell |
| 4,756,087 | A | 7/1988 | Sing |
| 5,044,089 | A | 9/1991 | Petkovic et al. |
| 5,094,396 | A | 3/1992 | Burke |
| 5,119,521 | A | 6/1992 | Clontz |
| 5,245,761 | A | 9/1993 | Waldherr |
| 5,386,643 | A | 2/1995 | Corcoran |
| 5,433,014 | A * | 7/1995 | Falk .............. G01D 5/347 455/67.11 |
| 5,440,820 | A | 8/1995 | Hwang |
| 5,448,837 | A | 9/1995 | Han-Teng |
| 5,471,761 | A | 12/1995 | Cheng |
| 5,575,077 | A | 11/1996 | Jung Tae |
| 5,691,923 | A | 11/1997 | Adler et al. |
| 5,743,021 | A | 4/1998 | Corcoran |
| 5,768,797 | A | 6/1998 | Trevino |
| 5,875,987 | A | 3/1999 | Pullen |
| 5,894,678 | A | 4/1999 | Masreliez et al. |
| 6,295,740 | B1 | 10/2001 | Mitchell |
| 6,308,432 | B1 | 10/2001 | Gilliam |
| 6,349,482 | B1 | 2/2002 | Gilliam et al. |
| 6,453,575 | B1 | 9/2002 | Hsieh |
| 6,477,785 | B1 | 11/2002 | Hsu |
| 6,550,155 | B1 | 4/2003 | Hsu |
| 6,622,113 | B2 | 9/2003 | Koski et al. |
| 6,643,948 | B1 | 11/2003 | Seymour |
| 6,658,755 | B2 * | 12/2003 | Arlinsky .............. G01B 3/1041 33/763 |
| 6,715,214 | B1 | 4/2004 | Lin |
| 6,868,620 | B2 | 3/2005 | Sanoner |
| 6,874,722 | B2 | 4/2005 | Wei |
| 6,964,114 | B1 | 11/2005 | Chen |
| 7,024,790 | B1 | 1/2006 | Qilian |
| 7,003,895 | B2 | 2/2006 | Harris et al. |
| 7,103,988 | B2 | 9/2006 | Sanoner |
| 7,146,743 | B2 | 12/2006 | Oura |
| 7,178,257 | B2 | 2/2007 | Kang et al. |
| 7,284,339 | B1 | 10/2007 | Campbell et al. |
| 7,293,367 | B1 | 11/2007 | Zhu et al. |
| 7,360,320 | B2 | 4/2008 | Kelley |
| 7,415,777 | B2 | 8/2008 | Campbell et al. |
| 7,451,552 | B2 * | 11/2008 | Haglof .............. G01B 3/12 33/767 |
| 7,458,536 | B2 | 12/2008 | Hui |
| 7,475,842 | B2 | 1/2009 | Campbell |
| 7,559,154 | B2 | 7/2009 | Levine et al. |
| 8,356,419 | B2 | 1/2013 | Lord |
| 8,863,399 | B2 | 10/2014 | Steele et al. |
| 9,719,764 | B2 | 8/2017 | Chiu |
| 9,774,986 | B2 | 9/2017 | Hoge |
| 9,874,428 | B1 | 1/2018 | Nelson et al. |
| 10,422,616 | B2 | 9/2019 | Orisni et al. |
| 10,605,579 | B2 | 3/2020 | McKinster |
| 10,928,175 | B2 * | 2/2021 | Hwang .............. G01B 3/1069 |
| 11,022,417 | B2 | 6/2021 | McKinster |
| 11,187,514 | B2 | 11/2021 | Li |
| 11,466,969 | B2 * | 10/2022 | Mueckl .............. G01B 3/1005 |
| 2007/0101599 | A1 | 5/2007 | Levine et al. |
| 2007/0186433 | A1 | 8/2007 | Campbell |
| 2014/0101948 | A1 | 4/2014 | Lee et al. |
| 2014/0250708 | A1 * | 9/2014 | Bauer .............. G01B 3/1061 33/760 |
| 2018/0120074 | A1 | 5/2018 | Orsini et al. |
| 2018/0299241 | A1 * | 10/2018 | Nikolic .............. G01B 3/1061 |
| 2019/0011244 | A1 | 1/2019 | Orsini et al. |
| 2023/0133202 | A1 * | 5/2023 | Bargetzi .............. G01B 3/1046 33/755 |

FOREIGN PATENT DOCUMENTS

| | | |
|---|---|---|
| EP | 0414972 A1 | 3/1991 |
| GB | 894505 | 4/1962 |
| KR | 10-2016-0135278 | 11/2016 |

* cited by examiner

MOTORIZED TAPE MEASURE

CROSS-REFERENCE TO RELATED PATENT APPLICATIONS

The present application is a continuation of U.S. application Ser. No. 17/122,764, filed Dec. 15, 2020, which is a continuation of International patent application No. PCT/US2020/037247, filed Jun. 11, 2020, which claims the benefit of and priority to U.S. Provisional Application No. 62/861,710, filed Jun. 14, 2019, which are incorporated herein by reference in their entireties.

BACKGROUND OF THE INVENTION

The present disclosure relates generally to the field of tape measures. The present disclosure relates specifically to a tape measure with both a retraction spring and a retraction motor and a sensor providing information to a controller/control system regarding operation of the retraction system (e.g., spring torque, retraction speed, etc.).

Tape measures are measurement tools used for a variety of measurement applications, including in the building and construction trades. Some tape measures include a graduated, marked blade wound on a reel and also include a retraction system for automatically retracting the blade onto the reel. In some tape measure designs, the retraction system is driven by a coil or spiral spring that is tensioned, storing energy as the tape is extended, and that releases energy to spin the reel, winding the blade back onto the reel.

SUMMARY OF THE INVENTION

One embodiment of the disclosure relates to a tape measure including a housing, a tape reel rotatably mounted within the housing, a rotational axis defined by the tape reel around which the tape reel rotates, an elongate tape blade wound around the tape reel, a spiral spring coupled to the tape reel, a detector made of a second material that is electrically-conductive, and a sensor that measures a capacitance of the detector. When the elongate tape blade is unwound from the tape reel to extend from the housing the spiral spring stores energy, and the spiral spring releasing energy drives rewinding of the elongate tape blade on to the tape reel. The spiral spring is made of a first material that is electrically-conductive.

Another embodiment of the disclosure relates to a tape measure including a housing, a tape reel rotatably mounted within the housing, a rotational axis defined by the tape reel around which the tape reel rotates, an elongate tape blade wound around the tape reel, a spiral spring located within the housing, a magnet that emits a magnetic field, and a detector that measures a change in the magnetic field caused by a repositioning of the spiral spring in response to a portion of the tape blade being extended from or retrieved into the housing. When the elongate tape blade is unwound from the tape reel to extend from the housing the spiral spring stores energy, and the spiral spring releasing energy drives rewinding of the elongate tape blade on to the tape reel. The spiral spring is made of a first material that is electrically-conductive.

Another embodiment of the disclosure relates to a tape measure including a housing defining an interior surface, a tape reel rotatably mounted within the housing, a rotational axis defined by the tape reel around which the tape reel rotates, an elongate tape blade wound around the tape reel, a spiral spring located within the housing, an axle rotatably mounted within the housing, the axle defining a first end and an opposing second end, a motor shaft rotatably mounted within the housing, the motor shaft defining a first end and an opposing second end, the first end of the motor shaft interfacing with the first end of the axle, and a sensor that measures a position of the second end of the motor shaft. When the elongate tape blade is unwound from the tape reel to extend from the housing the spiral spring stores energy, and the spiral spring releasing energy drives rewinding of the elongate tape blade on to the tape reel.

Another embodiment of the disclosure relates to a motorized tape measure with a sensor. The sensor measures an aspect of the tape measure, such as the speed at which the tape blade is being extracted out of or retrieved into the housing, an amount that the tape blade is still in the housing, and/or an estimated amount of tension being exerted by the retraction system. Based on these measurements, the motor exerts a force on the tape spool. For example, the motor may exert a counter-force on the retraction system, thus moderating the speed at which the tape blade is retrieved into the housing.

According to one embodiment, a tape measure includes a sensor, a housing, an arbor that rotates within the housing, a tape reel that rotates within the housing, an elongate tape blade wound around the tape reel, a retraction system for the elongate tape blade, a hook assembly coupled to an outer end of the elongate tape blade, a spiral spring, and a motor that interfaces with the retraction system. When the elongate tape blade is unwound from the tape reel to extend from the housing, the spiral spring stores energy, and the spiral spring releasing energy drives rewinding of the elongate tape blade on to the tape reel. The sensor measures an aspect of the tape measure and generates a control signal. The motor receives the control signal and interfaces with the retraction system based on the control signal.

In more specific embodiments, the motor interfaces with the tape spool via a clutch, such as a detent clutch or a slip clutch. The clutch provides an upper limit on the amount of tension in the retraction system, so when the maximum amount of tension is exceeded the clutch slips to prevent a further increase to the tension. The clutch includes an adjustment mechanism that permits a user to control the maximum amount of tension that the clutch can receive before slipping.

In another specific embodiment, the tape measure includes a circuit board and a position sensor. The position sensor measures the positioning of the spring, such as by detecting the proximity of the spring to one or more sensing locations of the position sensor. In one example, the position sensor includes a series of concentric circles of varying diameters from an axis around which the spring is centered. The different concentric circles measure the amount (e.g., magnetic interference, density, mass) of the spring in proximity to the respective circle. Based at least in part on those measurements, the circuit board generates a control signal for the motor to interface with the retraction system. In one specific embodiment, the position sensor is one or more metal detectors.

In another specific embodiment, the tape measure further includes a torque switch. The torque switch includes an arbor spacer coupled to the arbor, and a motor shaft spacer coupled to the motor. The arbor spacer and the motor shaft spacer are circumferentially biased away from each other by one or more biasing elements. The orientation of the arbor spacer and the motor shaft spacer changes in response to the tension in the tape measure's retraction system. The change in the relative orientation of the components of the torque switch is measured, and based on that measurement a control signal for the motor is generated.

In another specific embodiment, the motor includes a shaft that is axially aligned with the arbor. The motor shaft and the arbor interface at a cammed interface. The arbor and the motor shaft define a collective length, which changes in response to the arbor and the motor shaft rotating with respect to each other. The tape measure further includes a biasing element that exerts a biasing force compressing the arbor and motor shaft together. A distance between the motor shaft and the housing is measured, and based on that measurement a control signal for the motor is generated.

In another specific embodiment, the elongate blade includes a series of markings arranged along the length of the elongate blade. In another specific embodiment, a rotating component in the tape measure, such as the tape spool, includes a series of markings that are radially arranged around a central axis. The sensor monitors the series of markings to determine a status of the tape measure. In various uses, the sensor monitors the speed that the markings are moving, and/or monitors a total displacement of the elongate blade (e.g., by counting the total number of markings that have moved past a sensor).

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Figure 1:
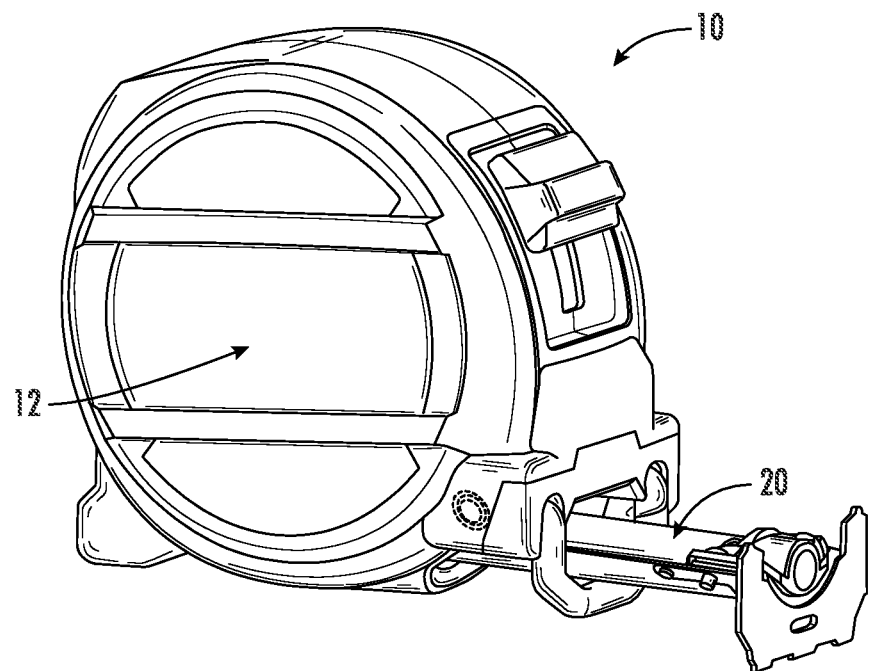
FIG. 1 is a perspective view of a tape measure with a motor and clutch, according to an exemplary embodiment.

Referring generally to the figures, various embodiments of a tape measure are shown. Various embodiments of the tape measure discussed herein include an innovative retraction system that includes a motor and sensor(s) that generate control signals for the motor. Some tape measure blades are susceptible to damage/breakage due to high speed during retraction. For example, high speeds during retraction may cause the tape blade to whip (e.g., the tendency of the tape measure blade to bend or snap back on itself during fast retraction), which can crack or tear the tape blade, and similarly, high retraction speeds can damage the tape blade when the tape hook contacts the tape housing at the end of retraction. Applicant believes that the tape measure retraction system described herein provides for retraction speed control that can limit such sources of tape measure damage while at the same time providing a more compact tape measure without sacrificing tape length or retraction performance.

As will generally be understood, in certain tape measure designs, a spring stores energy during tape blade extension and applies a force/torque to a reel causing the tape blade to wind on to the reel during tape blade retraction. Various aspects of spring design, such as spring energy, torque profile, spring constant, etc., are selected to ensure that operation of the spring has enough energy to provide satisfactory tape retraction. However, because of the physics and characteristics of the typical tape measure spiral spring, in order to ensure full tape retraction at a satisfactory speed, the typical tape measure spiral spring delivers excess energy to the tape blade during retraction, which in turn translates into undesirably highly retraction speeds and whip, particularly toward the end of retraction. In addition, for a given spiral spring design increasing spring energy to provide for retraction of longer, wider and/or thicker measuring tape blades typically requires use of a larger spiral spring, which in turn results in a larger tape measure.

As discussed herein, Applicant has developed various innovative tape measure blade retraction systems that provide a desired level of spring energy while utilizing a relatively short or small volume spring, while maintaining a relatively small tape measure housing (e.g., a tape measure outer diameter) and/or while providing desired retraction characteristics. As discussed in more detail, the tape retraction system discussed herein utilizes a motor that interfaces with the retraction system based on measurements performed by sensors. The sensors monitor the current state of the tape measure (e.g., the amount of torque currently being exerted by the spiral spring) and the changing state of the tape measure (e.g., the speed at which the tape blade is being extracted from or retrieved into the housing). Based on this information, the tape retraction system adjusts the tension in the spring to moderate the retraction speed of the tape blade, thus reducing the chances of the tape blade whipping or high retraction speeds damaging the tape blade when tape hook encounters the housing at the end of retraction.

In various embodiments, the tape retraction system includes a clutch between the motor and the tape reel around which the tape blade is wrapped. The clutch limits and/or prevents the motor from over-torqueing the tape reel by limiting an amount of tension in the spiral spring.

Figure 2:
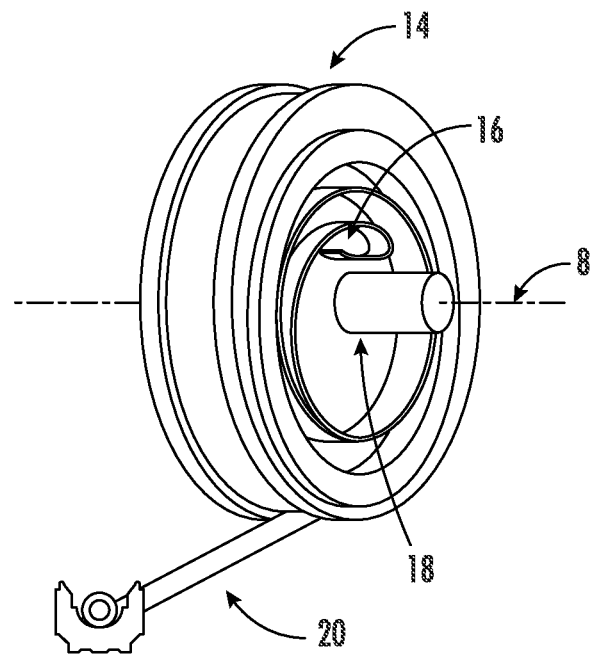
FIG. 2 is a detailed view of a portion of the tape measure depicted in FIG. 1.

Turning to FIGS. 1-2, various aspects of a tape measure, shown as tape measure 10, are shown. In FIGS. 1-2 tape measure 10 includes a housing 12, a sensor, a tape reel 14, an elongate tape blade 20, a hook assembly coupled to an end of the elongate tape blade 20, a spiral spring 16, and a motor.

A motor in tape measure 10 interfaces with the retraction system of the tape measure 10 based at least in part on a signal generated by a sensor. The tape blade 20 is wound around the tape reel 14, which is rotatably coupled to the housing, rotating about axis 8 with respect to housing 12. The spiral spring 16 is coupled to the tape reel 14 such that the spiral spring 16 stores energy when the elongate tape blade 20 is unwound from the tape reel to extend from the housing, and the spiral spring 16 releasing energy drives rewinding of the elongate tape blade 20 on to the tape reel 14. In general, the tape blade 20 is an elongated strip of material including a plurality of graduated measurement markings, and in specific embodiments, the tape blade 20 is an elongated strip of metal material (e.g., steel material) that includes an outer most end coupled to a hook assembly. The tape blade 20 may include various coatings (e.g., polymer coating layers) to help protect the tape blade 20 and/or the graduated markings of the blade from wear, breakage, etc.

The tape measure 10 includes a retraction system that includes a spring, such as a spiral spring 16. In general, the spiral spring 16 is coupled between an arbor 18 and a tape reel 14 (or through the tape reel 14 to directly couple to an inner end of the elongate tape blade) such that the spiral spring 16 is coiled or wound to store energy during extension of the tape from the housing 12 and is unwound, releasing energy, driving rewinding of the tape blade 20 onto the tape reel 14 during retraction of the tape blade 20 (e.g., following release or unlocking of the tape blade 20). Specifically, when the tape blade 20 is unlocked or released, the spring 16 expands, driving the tape reel 14 to wind up the tape blade 20 and to pull the tape blade 20 back into the housing 12.

Figure 3:
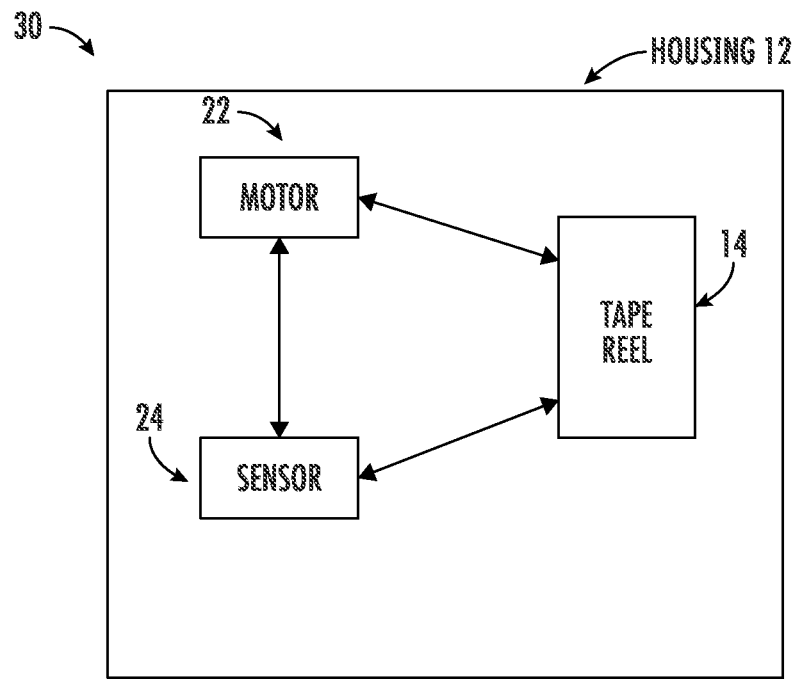
FIG. 3 is a schematic view of a tape measure, according to an embodiment.
Figure 4:
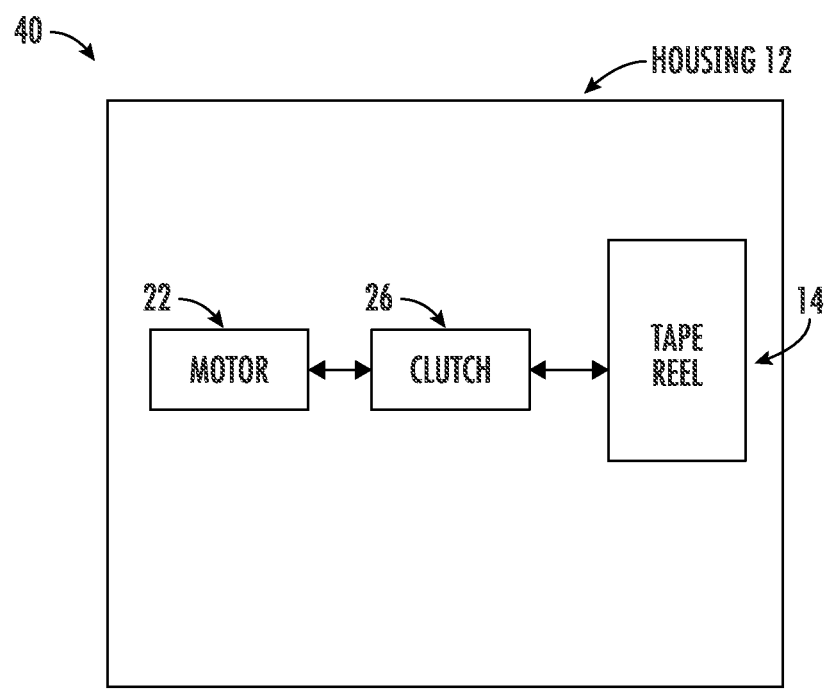
FIG. 4 is a schematic view of a tape measure, according to an embodiment.
Figure 5:
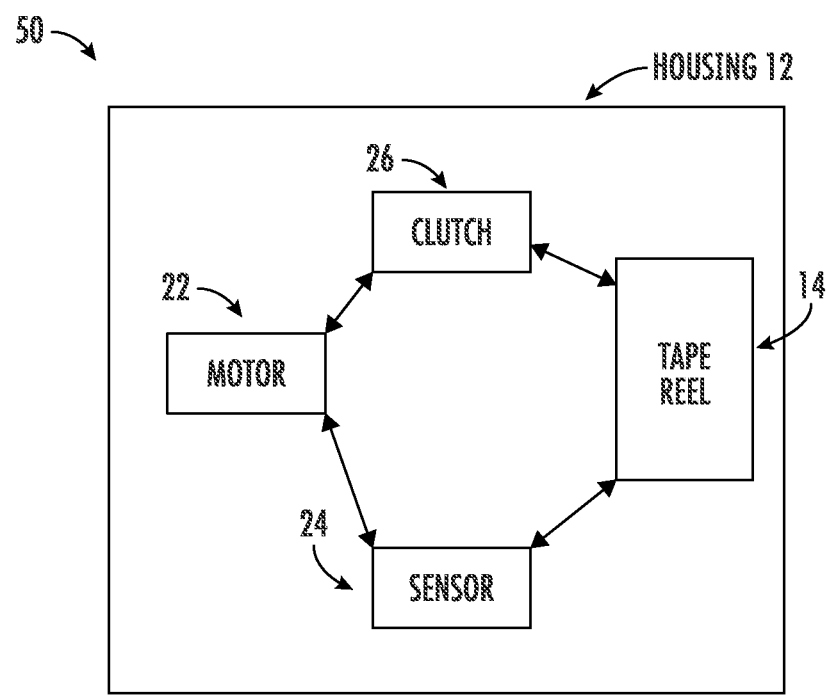
FIG. 5 is a schematic view of a tape measure, according to an embodiment.

Turning to FIGS. 3-5, schematics of various tape measures in shown. Turning to FIG. 3, tape measure 30 includes a motor 22 that interfaces with a tape reel 14 that is coupled to a tape blade 20. A sensor 24 monitors the status of the tape reel 14, such as a position of and/or an amount of tension being stored by the spiral spring 16. In one embodiment, a static state of tape measure is measured by sensor 24, such as the torque exerted by the spiral spring at a given time. Alternatively, a moving component of tape measure is measured, such as the speed at which the elongate tape blade is being extracted from or retrieved into the tape measure housing. Based on measurements by the sensor 24, the motor 22 is controlled to adjust the tension in the spiral spring coupled to the tape reel 14.

Turning to FIG. 4, in specific embodiments, tape measure 40 the motor 22 interfaces with tape reel 14 via a clutch 26. The clutch 26 limits and/or prevents the motor 22 from providing an excessive amount of tension into the spiral spring coupled to the tape reel 14. Similar to FIG. 3, the sensor 24 monitors the status of the tape reel 14, such as an amount of tension being stored by the spiral spring.

Turning to FIG. 5 in specific embodiments, tape measure 50 the motor 22 interfaces with the tape reel 14 via a clutch 26. The clutch 26 limits and/or prevents the motor 22 from providing an excessive amount of tension into the spiral spring coupled to the tape reel 14. Similar to FIG. 3, the sensor 24 monitors the status of the tape reel 14, such as an amount of tension being stored by the spiral spring. Based on measurements by the sensor 24, the motor 22 is controlled to adjust the tension in the spiral spring coupled to the tape reel 14.

Turning to FIGS. 6-24, various aspects of sensors and clutches for tape measures are provided. FIGS. 6-19 depict various aspects of sensors that are used in tape measures, and FIGS. 20-24 depict various aspects of clutches that are used in motorized tape measures between the motor and the tape reel. It is contemplated herein that any of the sensors described herein may be used with any of the clutches described herein, consistent with the schematic depiction of tape measure 50 depicted in FIG. 5.

Figure 6:
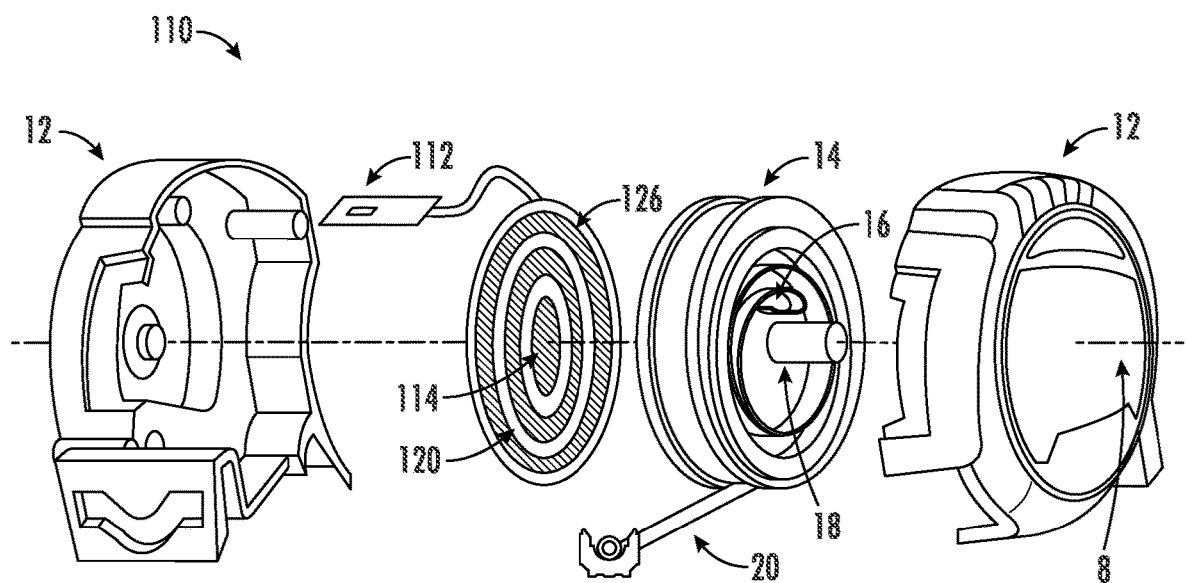
FIG. 6 is an exploded view of a tape measure, according to an embodiment.
Figure 7:
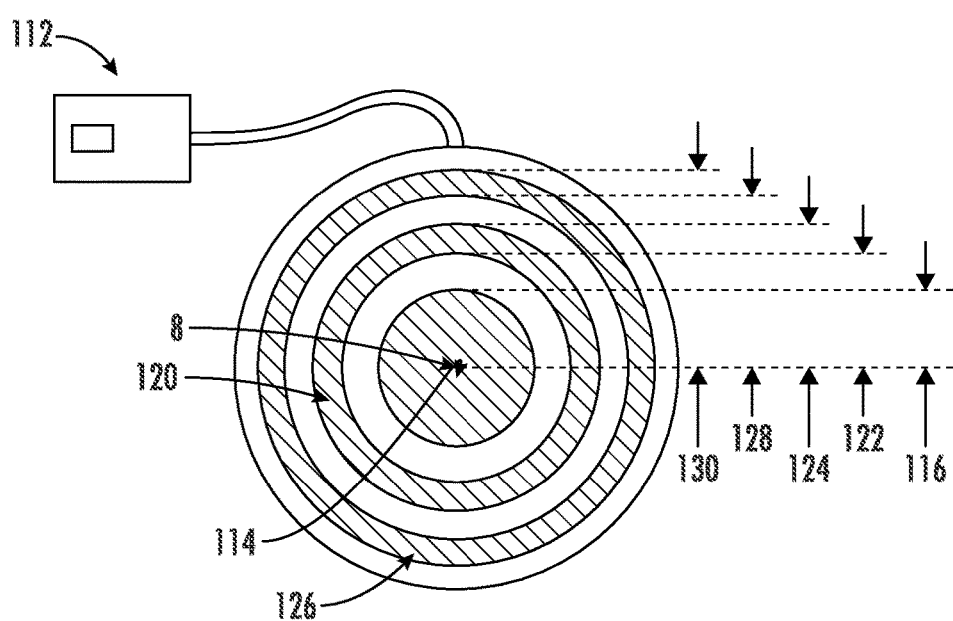
FIG. 7 is a detailed view of a portion of the tape measure of FIG. 6.

Turning to FIGS. 6-7, various aspects of a sensor for tape measure 110 are shown. Tape measure 110 is similar to tape measure 10, 30, 40, and 50, except for the differences described herein. Tape measure 110 includes a sensor, shown as capacitive sensor 112, that interacts with antennas 114, 120 and 126 to detect torque and/or position of spiral spring 16. Spiral spring 16 is coupled to tape reel 14 and stores energy as the tape blade 20 is retrieved from tape measure 110.

In a specific embodiment, sensor 112 measures a capacitance of one or more of first antenna 114, second antenna 120 and third antenna 126. Antenna 114, 120 and 126 are arranged on a platform, shown as a circuit board. Based on the capacitance measurement(s), sensor 112 determines whether to send a signal to adjust an amount of tension in spiral spring 16.

The sensor 112 can detect the spooling or unspooling of the spring 16 by detecting whether the mass of the spring 16 is near the arbor 18, near the peripheral wall of the tape reel 14, or in-between. In a specific embodiment, antennas 114, 120 and 126 are formed of an electrically-conductive material, and spring 16 is formed of an electrically-conductive metal, such as steel. Sensors 112 measure an electrical capacitance of one or more of antennas 114, 120 and 126 with respect to spring 16 based on a measurement of an amount of spring 16 proximate the respective antenna 114, 120 and 126. For example, when the spring 16 is wound relatively tightly around the arbor 18, the innermost antenna 114 can detect this position (e.g., by comparing a threshold to the capacitance of the innermost antenna 114 and the spring 16). Similarly, the outermost antenna 126 can detect that the spring 16 is unwound and much of the mass of the spring 16 is near the interior wall 28 of the tape reel 20.

In a specific embodiment, sensor 112 generates a first signal based on a measurement of the electrical capacitance of antenna 114, generates a second signal based on a measurement of the electrical capacitance of antenna 120, and generates a third signal based on a measurement of the electrical capacitance of antenna 126. In another embodiment, sensor 112 generates a first signal based on measurements of the electrical capacitance of one or more of antenna 114, antenna 120, and antenna 126.

Turning to FIG. 7, various radii of antennas 114, 120 and 126 with respect to rotational axis 8 are shown. In a specific embodiment, antennas 114, 120 and 126 extend circumferentially around axis 8 and are arranged in concentric circles around rotational axis 8. With respect to rotational axis 8, outermost antenna 126 has an inner radius 128 and an outer radius 130, central antenna 120 has an inner radius 122 and an outer radius 124, and innermost antenna 114 has an outer radius 116 and an inner radius that has a distance of zero (0), because innermost antenna 114 is positioned on rotational axis 8.

Any number of antennas 114, 120 and 126 can be used to provide any suitable level of resolution of detection. Similarly, an analog output may also be used by comparing capacitance of various antennas (e.g., compare the capacitance of the inner most conductive ring to the outermost conductive ring). In various embodiments, the antennas can be inductive sensor coils that change inductance relative to the position of the spiral spring 16. The resolution of inductance measurement(s) can provide a digital response (e.g., above a certain threshold vs below), or it can provide a very fine measurement (e.g., similar to an analog signal).

In a specific embodiment, antennas 114, 120 and 126 are arranged symmetrically around the rotational axis 8 of the spring 16 (best-shown FIGS. 6-7). In another embodiment, the antennas are arranged asymmetrically around the rotational axis 8 of the spring 16. In a specific embodiment, a motor receives a signal from sensor 112 and adjust an amount of tension in spiral spring 16.

Figure 8:
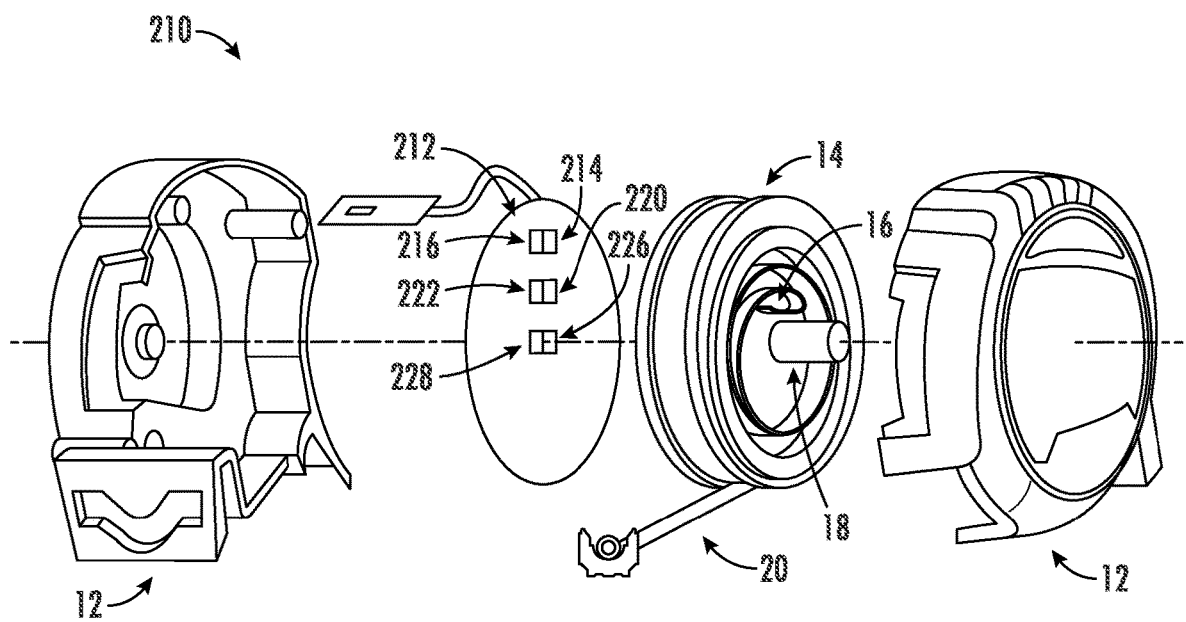
FIG. 8 is an exploded view of a tape measure, according to an embodiment.
Figure 9:
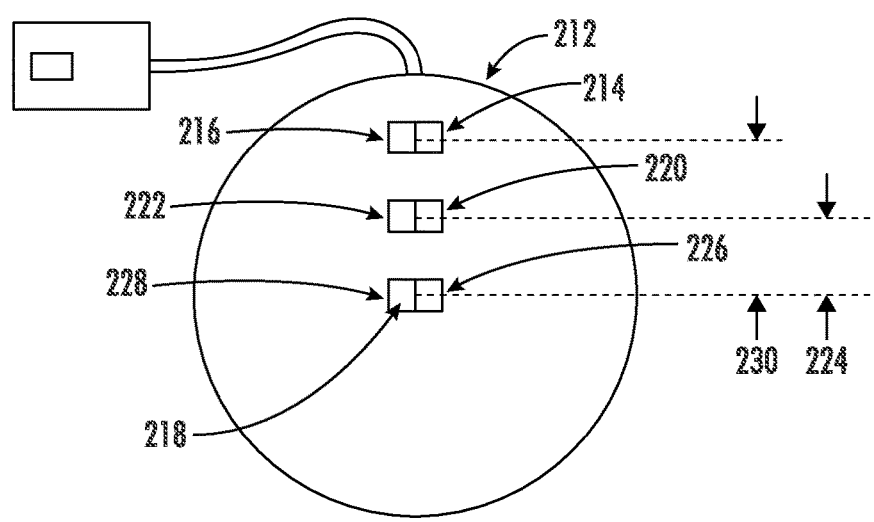
FIG. 9 is a detailed view of a portion of the tape measure of FIG. 8.

Turning to FIGS. 8-9, various aspects of tape measure 210 are shown. Tape measure 210 is similar to other tape measures described herein except for the identified differences. One or more Hall-effect sensors (e.g., of copper), shown as detectors 214, 220 and 226, can be placed at various radii 218, 224 and 230 from the center of the arbor 18 to detect the mass of the spring 16. For example, one or more of detectors 214, 220 and 226 may measure a change in the magnetic field caused by a repositioning of the spiral spring 16 in response to the tape blade 20 being extended from or retrieved into the housing 12. In another embodiment, one or more of detectors 214, 220 and 226 measure a strength and/or an orientation of magnetic fields passing through that respective detector 214, 220 and 226. The sensor 212, such as a circuit board, receives the measurements from the plurality of detectors 214, 220 and 226 and based on those measurements estimates the extent to which the spring 16 is wound or unwound (e.g., the extent to which the mass of spring 16 is centered near its rotational axis 8 or the extent to which the spring 16 is expanded away from its rotational axis 8).

In a specific embodiment, detectors 214, 220 and 226 and magnets 216, 222 and 228 are positioned at various radii 218, 224, and 230 around axis 8. Magnets 216, 222 and 228 each produce a magnetic field that is detected by detectors 214, 220 and 226. Spring 16 affects the magnetic fields produced by magnets 216, 222 and 228 such that as spring 16 adjusts position (e.g., when tape blade is spooled or unspooled), the strength and/or orientation of the magnetic fields changes. Detectors 214, 220 and 226 measure the magnetic field(s) and/or the changes to the magnetic field(s) and generate one or more signals to sensor 212 based on the measurements of the magnetic fields. Sensor 212 in turn generates a first signal as a result of measuring the change in the magnetic field, the first signal indicating a configuration of the spiral spring 16. In a specific embodiment, the detectors 214, 220 and 226 are arranged proximate one the magnets 216, 222 and 228 (e.g., the detectors interfaces against a magnet).

Referring to FIGS. 10-13, various aspects of device to measure torque, shown as torque switch 336, of spiral spring 16 in tape measure 310 are shown. Tape measure 310 is similar to the other tape measures described herein except for the differences noted. Tape measure 310 includes another way to detect torque in spiral spring 16 by detecting relative position of a motor shaft 326 and an arbor shaft 312 that are normally spaced apart.

Figure 10:
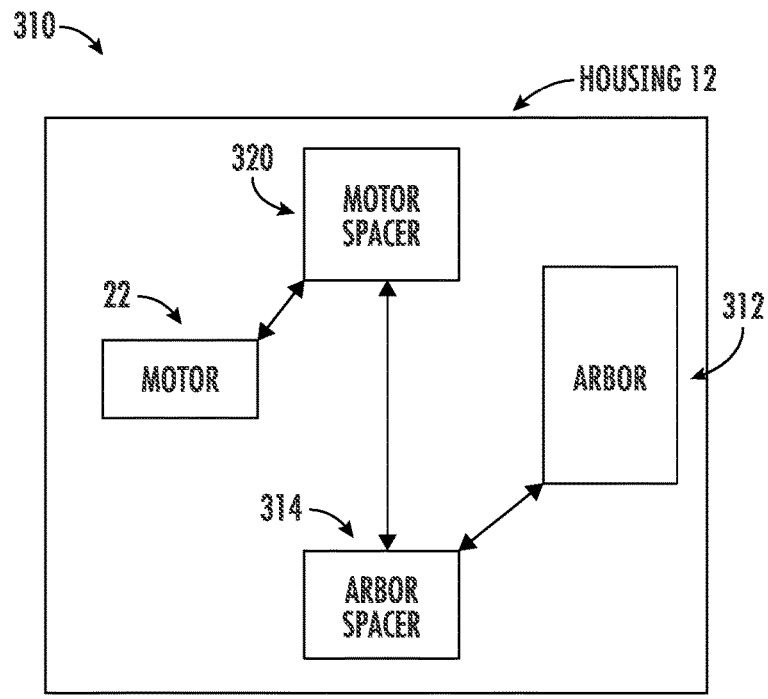
FIG. 10 is a schematic view of a tape measure, according to an embodiment.
Figure 11:
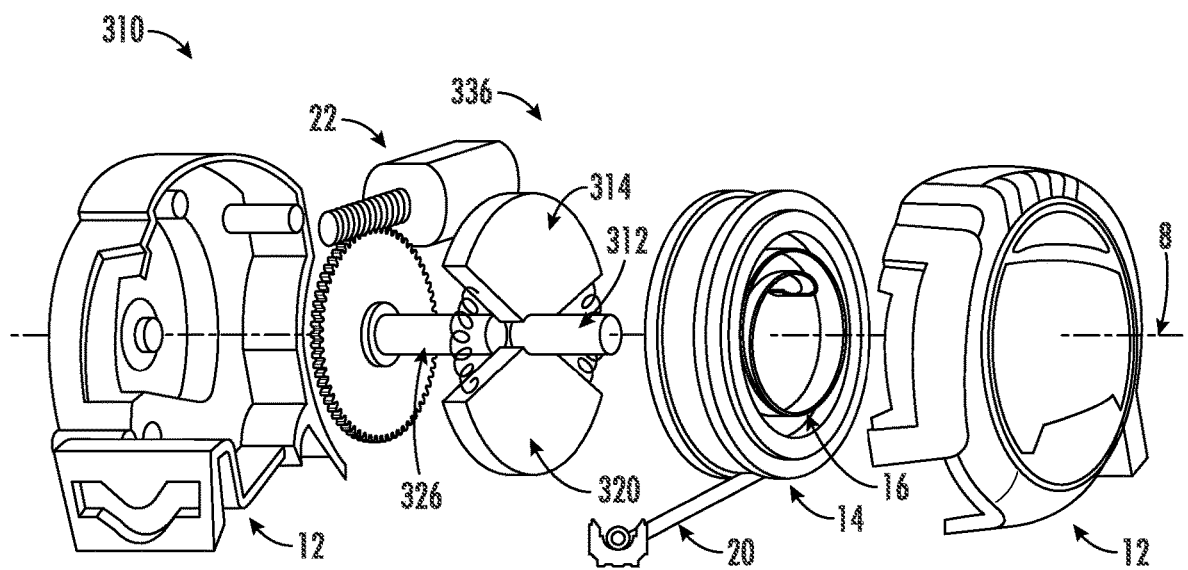
FIG. 11 is an exploded view of the tape measure of FIG. 10.
Figure 12:
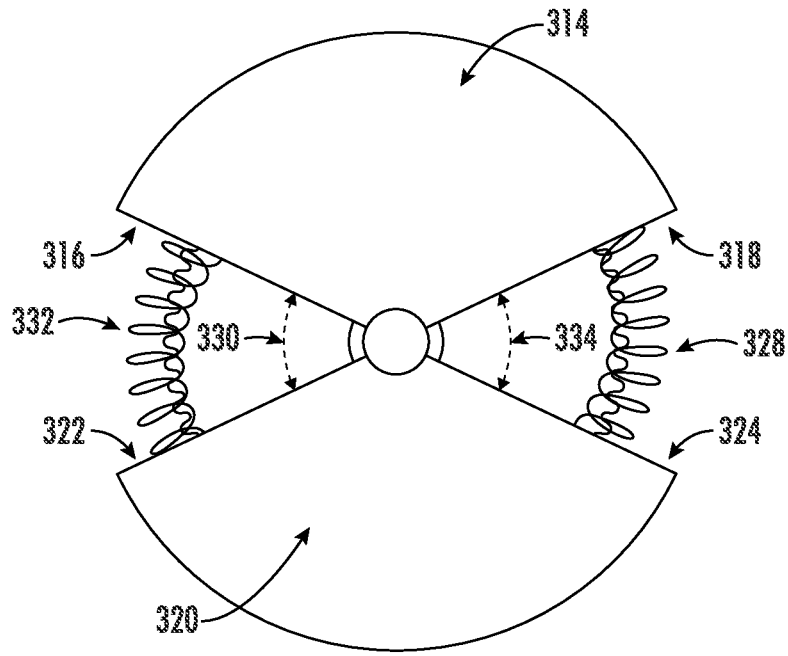
FIG. 12 is a detailed view of a portion of the tape measure of FIG. 10.
Figure 13:
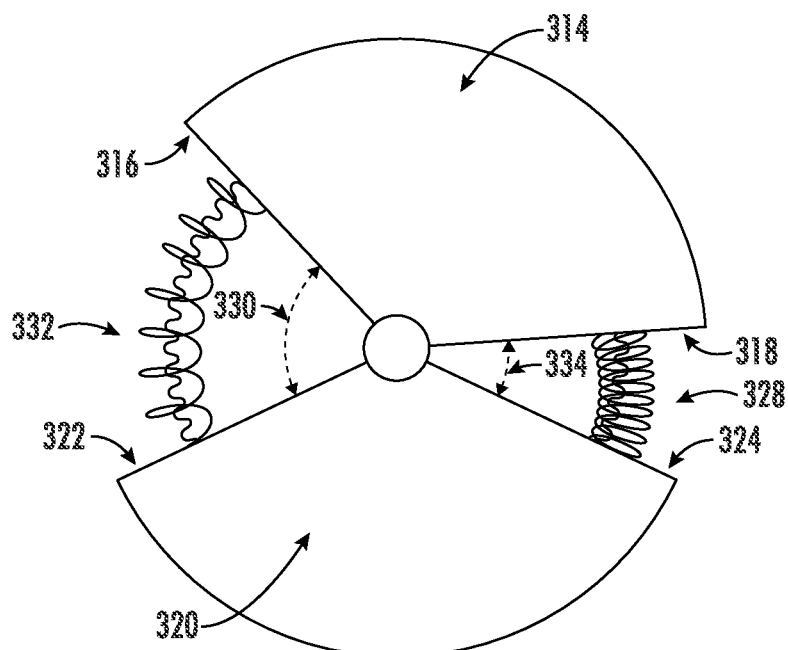
FIG. 13 is a detailed view of the portion of the tape measure depicted in FIG. 12, shown in a different configuration.

In FIG. 10, the motor shaft 326 is fixedly coupled to a motor shaft spacer 320 in such a way that the motor shaft 326 and the motor shaft spacer 320 do not move with respect to one another. Similarly, the arbor 312 and the arbor spacer 314 are fixedly coupled together. Both the arbor spacer 314 and the motor shaft spacer 320 are positioned to rotate with respect to the arbor 312. The arbor spacer 314 and the motor shaft spacer 320 both rotate around axis 8 but can rotate at slightly different rates (e.g., in one embodiment one spacer can lag or lead the other as the two spin, but one cannot freely spin while the other remains stationary; in another embodiment one can spin while the other remains stationary).

The arbor spacer 314 and motor shaft spacer 320 are biased away from each other with respect to axis 8 by one or more biasing elements, shown as springs 328, 332. Springs 328, 332 are placed between the two spacers 314, 320. As a torque is applied (e.g., by the motor shaft 320), the assembly rotates, but the relative position between the spacers 314, 320 changes. For example, angle 330 and angle 334 between arbor spacer 314 and motor spacer 320 change. Angle 330 is defined between end 316 of arbor spacer 314 and end 322 of motor spacer 320. Angle 334 is defined between end 318 of arbor spacer 314 and end 324 of motor spacer 320.

The amount of change for angle 330 and angle 334 is dependent on the amount of torque applied and the strength of the springs 328, 332. The angles 330, 334 between the spacers 314, 320 can be measured in an analog manner (e.g., using a distance meter such as an optical sensor to measure the distance between two points on the spacers 314, 320; when the speed of the arbor shaft 312 or motor shaft 326 is known, measuring the time it takes for the open portion to rotate through an optical sensor) or in a discrete manner (e.g., placing a mechanical switch between the spacers 314, 320 that connects when a torque threshold is overcome).

When motor 338 receives a control signal to exert a force on the arbor 312, the motor 338 generates a force against the motor shaft spacer 320. Motor shaft spacer 320 thereby exerts a force against the biasing elements, shown as springs 328, 332, which exert a force against the arbor spacer 314. Because the arbor spacer 314 is fixedly coupled to the arbor 312, which is coupled to the spring 16 of tape measure 310, the arbor spacer 314 and arbor 312 adjust position based on the interfering biasing forces from the springs 328, 332 and the spring 16 of tape measure 310. As a result, the angles 330, 334 between the motor shaft spacer 320 and the arbor spacer 314 changes. The change of one or more of angles 330, 334 (compare FIG. 12 to FIG. 13) is measured to estimate the current torque exerted between the spiral spring 16 of tape measure 310 spring and springs 328, 332. Based on these measurements a control signal is generated and the motor 338 selectively adjusts the force that motor 338 is indirectly exerting on the arbor 312 via the motor shaft spacer 320.

In another embodiment, torque on the spiral spring 16 can be determined by measuring the input angle of the main spring and compare it to the output angle of the tape spool. The output is simply that of the tape spool 20. Once the two angles are known, the torque can be inferred via software because the main spring 16 has an associated force with the relative angle.

Figure 14:
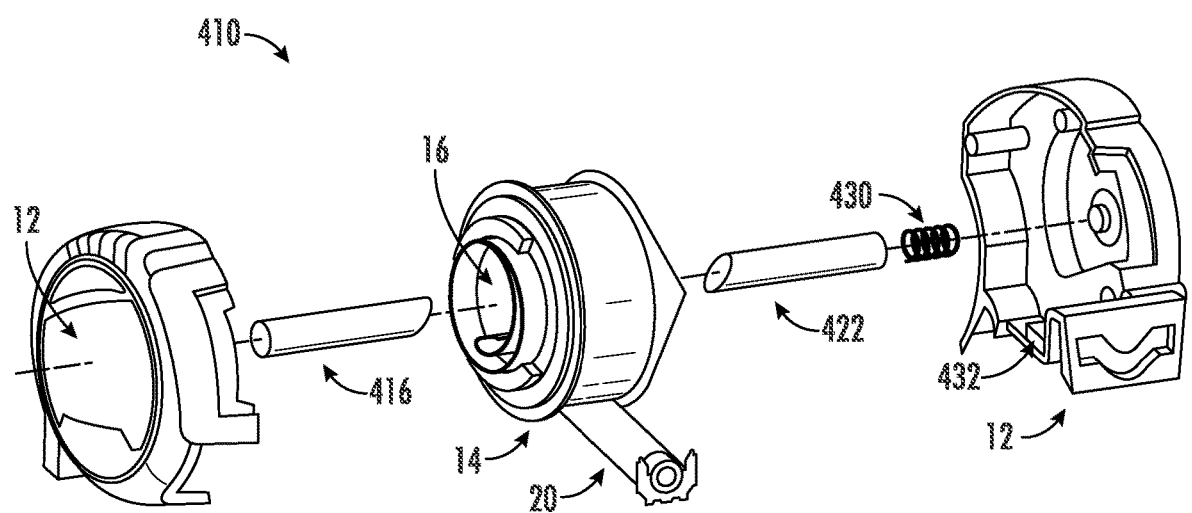
FIG. 14 is an exploded view of a tape measure, according to an embodiment.
Figure 15:
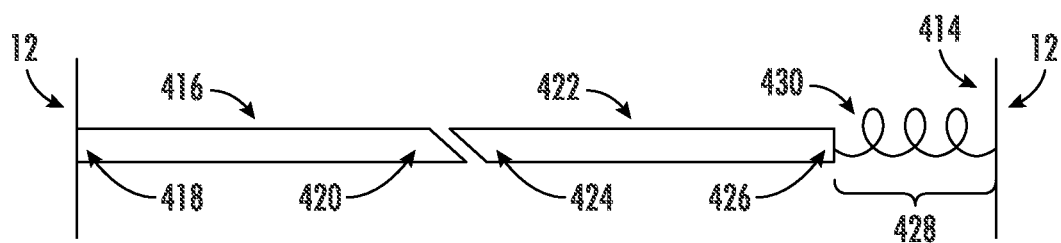
FIG. 15 is a schematic view of a portion of the tape measure of FIG. 14.
Figure 16:
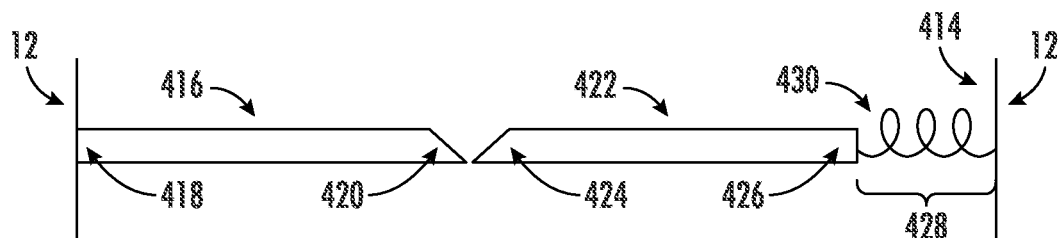
FIG. 16 is a detailed view of the portion of the tape measure depicted in FIG. 15, shown in a different configuration.

Referring to FIGS. 14-16, various aspects of tape measure 410 are shown. Tape measure 410 is similar to the other tape measures described herein except as noted. Torque of spring 16 coupled to tape reel 14 is measured by monitoring a linear movement of one of the arbor 416 and motor shaft 422. Between two sides of the housing 12 is an axle, shown as arbor 416, a secondary axle, shown as motor shaft 422, and a spring 430. Arbor 416 extends from first end surface 418 to second end surface 420, and motor shaft 422 extends from first end surface 424 to second end surface 426. Second end surface 420 of arbor 416 and first end surface 424 of motor shaft 422 interface with each other. In a specific embodiment, second end surface 420 of arbor 416 and first end 424 of motor shaft 422 are both angled (best-shown FIGS. 15-16). As the motor shaft 422 and the arbor 416 rotate with respect to one another and interface against each other, the total length of the arbor 416 and motor shaft 422 varies.

Sensor 432 monitors the length of arbor 416 and motor shaft 422, such as by monitoring distance 428 between second end 426 and the interior surface of housing 12. In a specific embodiment, sensor 432 generates a first signal as a result of measuring the position of the second end 426 of the motor shaft 422, the first signal indicating a configuration of the spiral spring 16.

The spring 430 presses motor shaft 422 towards arbor 416, thereby biasing the total length of the arbor 416 and motor shaft 422 to be as short as possible when no torque is applied. As torque is applied, the force spring 430 is overcome, and the angled surfaces rotate with respect to one another, thereby causing the spring 430 to compress and the distance 428 between motor shaft 422 and housing 12 to decrease. The distance 428 can be measured by sensor 432 analog or digitally.

In one embodiment, when the elongate tape blade 20 is fully retracted within the housing 12, spiral spring 16 of tape measure 410 is in a low/no torque state (best-shown in FIG. 15). In this position, the axially-aligned spring 430 biases motor shaft 422 towards the arbor 416, and the distance 428 measured between the motor shaft 422 and housing 12 is at its greatest. As the elongate tape blade 20 is extracted from the housing 12, arbor 416 rotates. The arbor 416 interfaces with the motor shaft 422 via their respective angled surfaces to bias the motor shaft 422 against spring 430. This reduces the distance 428 between the motor shaft 422 and inner surface 414 of housing 12. One or more sensors monitor this distance and based on the measurement(s) the system infers the current positioning of the elongate tape blade 20 (e.g., fully retracted within the housing 12, fully extended out of the housing 12, an intermediate state between fully retracted and fully extended). The arbor 416 is configured to rotate less than 360 degrees with respect to the motor shaft 422 to avoid resetting the distance 428 being measured.

It is contemplated herein that any aspect of the interface between motor shaft 422 and arbor 416 may be measured, such as an orientation of the arbor 416 with respect to the motor shaft 422, a distance between the arbor 416 and the housing 12 (if the arbor 416 is permitted to longitudinally slide along its axis rather than the motor shaft 422).

Figure 17:
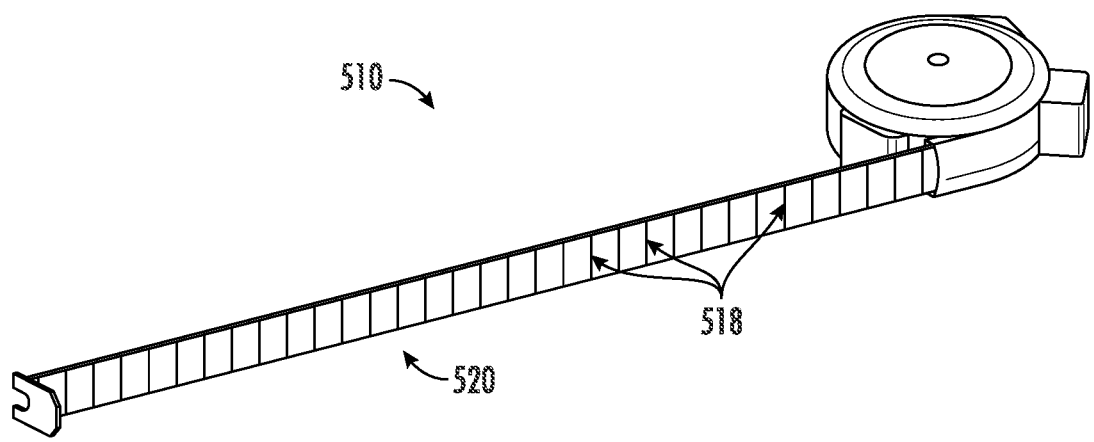
FIG. 17 is a perspective view of a tape measure, according to an embodiment.
Figure 18:
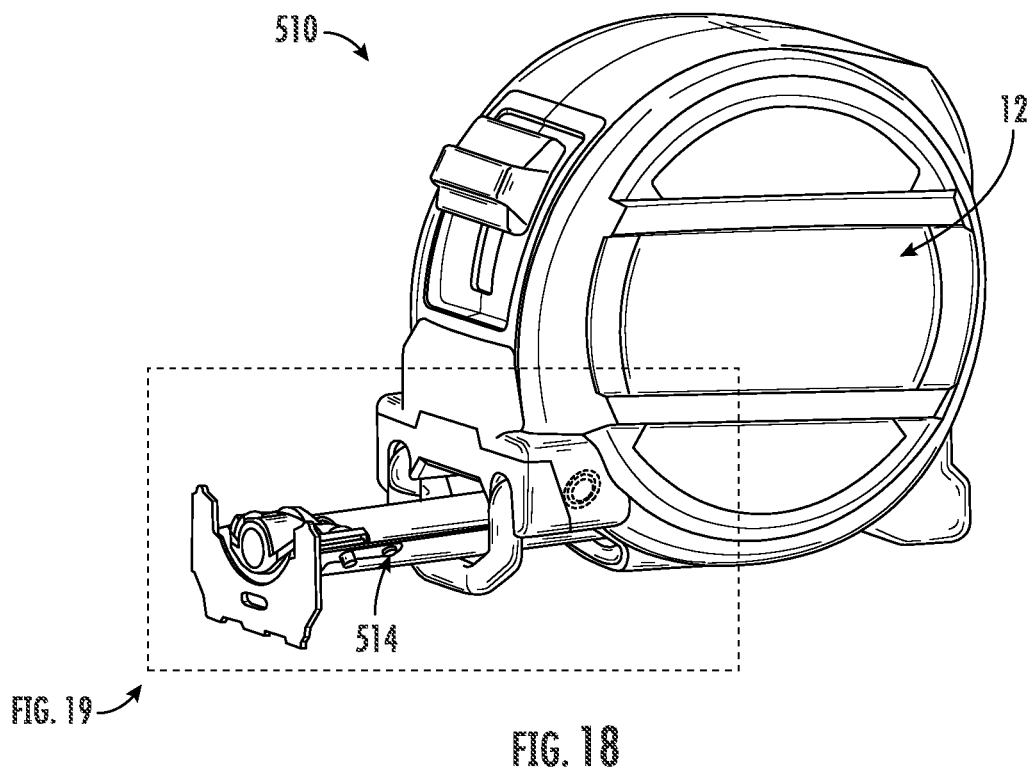
FIG. 18 is a perspective view of the tape measure of FIG. 17, according to an embodiment.
Figure 19:
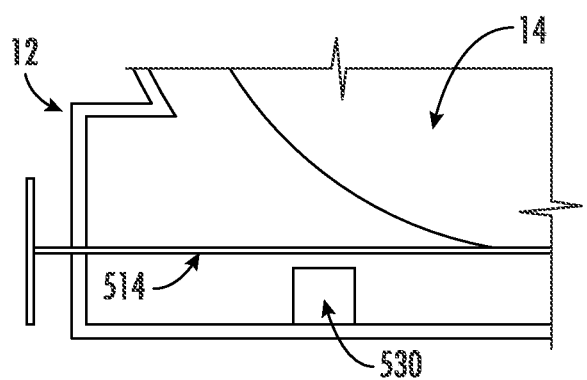
FIG. 19 is a schematic view of the tape measure of FIG. 18, according to an embodiment.
Figure 20:
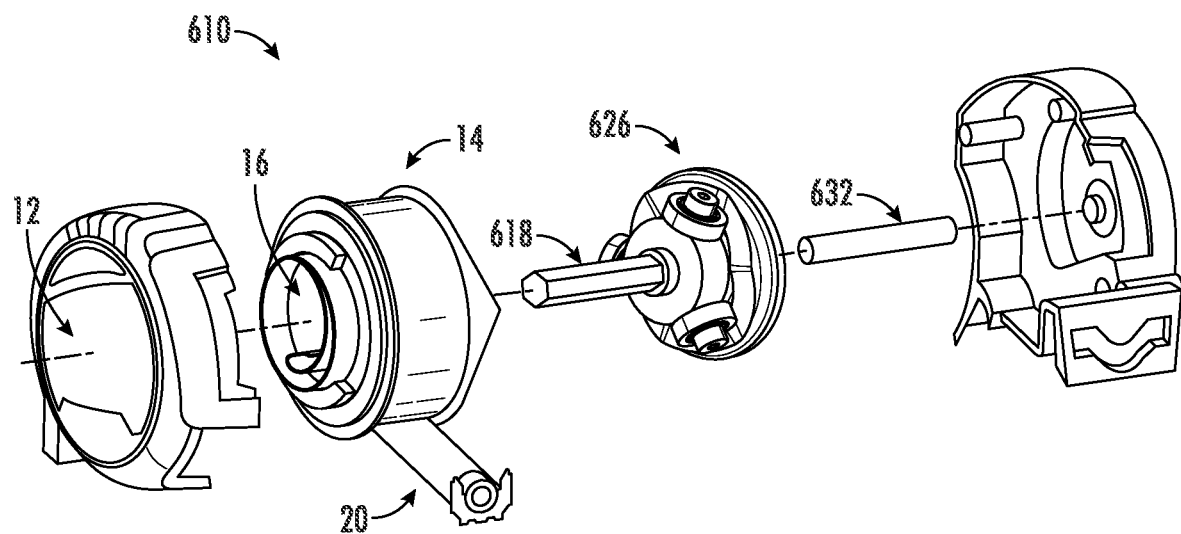
FIG. 20 is an exploded view of a tape measure, according to an embodiment.
Figure 21:
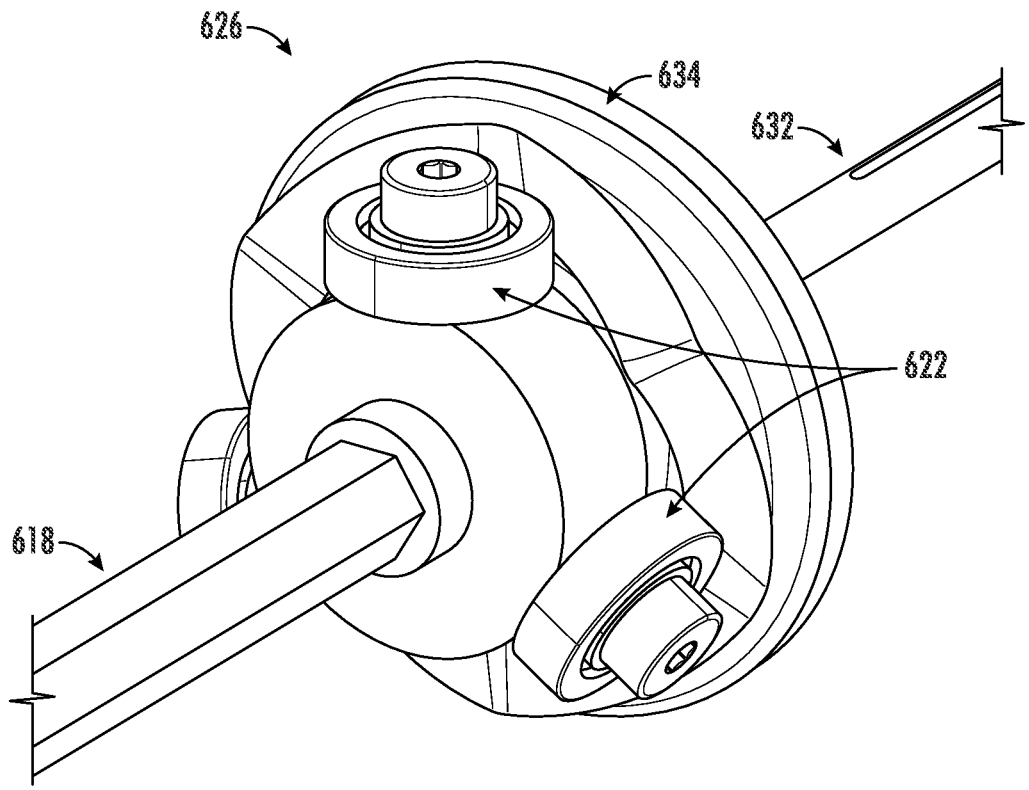
FIG. 21 is a detailed view of a portion of the tape measure of FIG. 20, according to an embodiment.
Figure 22:
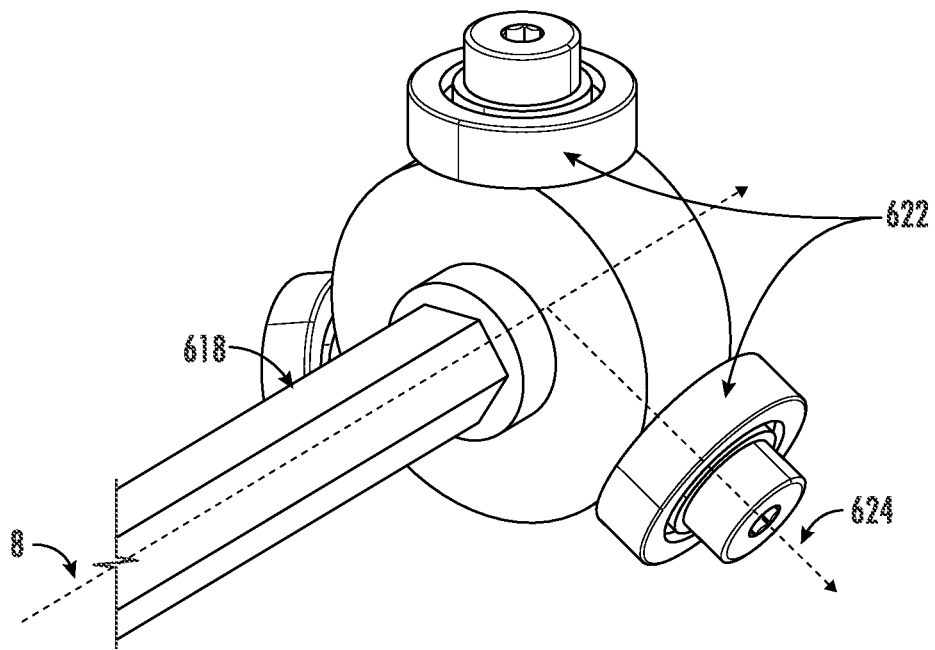
FIG. 22 is a detailed view of a portion of the tape measure of FIG. 20, according to an embodiment.
Figure 23:
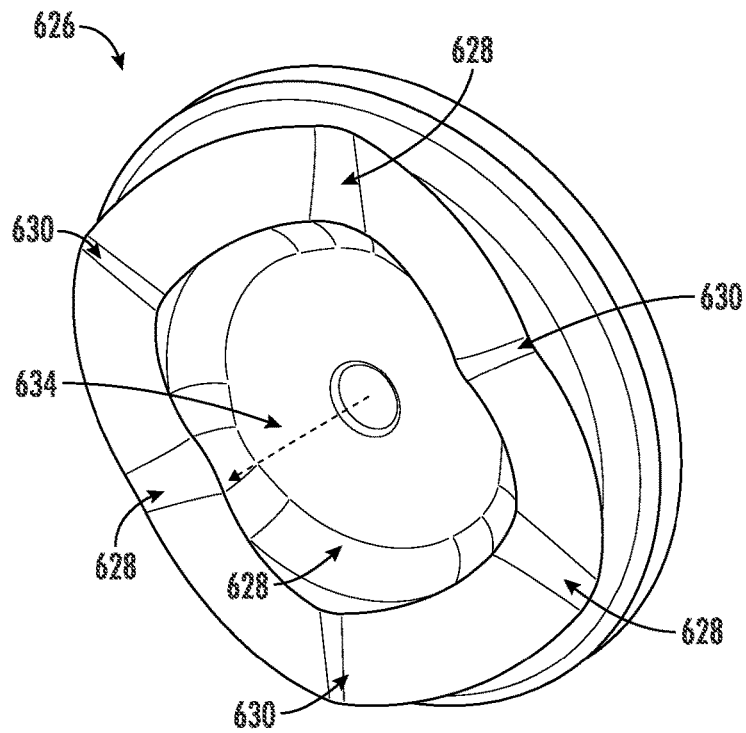
FIG. 23 is a detailed view of a portion of the tape measure of FIG. 20, according to an embodiment.

Referring to FIGS. 17-19, various aspects of tape measure 510 are shown. Tape measure 510 is similar to the other tape measures described herein except for the differences noted. Tape measure 510 monitors tension of spiral spring 16 by monitoring the speed that tape blade 520 is moving and/or the amount of tape blade 20 that has been paid out or reeled in. Speed of the tape blade 520 can be determined by using an optical detector 530 that detects indicia, shown as markings 518, on a bottom surface the tape blade 520 (e.g., an alternating white and black stripe pattern).

Turning to FIG. 19, a schematic view of a portion of tape measure 510 is shown. In a specific embodiment, optical detector 530 is located proximate where tape blade 20 exits housing. From this position, optical detector 530 monitors the speed that tape blade 520 is moving past optical detector 530, and/or optical detector 530 monitors an amount of tape blade 520 that has moved past optical detector 530 to exit housing 12 (e.g., by counting markings 518 that have moved past optical detector 530).

In one embodiment, the elongate tape blade 520 is monitored to determine a speed at which the elongate tape blade 520 is being extracted from or retrieved into the housing 12. The retraction system determines the speed at which the markings are moving past the sensor (e.g., by measuring an amount of time between when neighboring markings move past the sensor). Based on that determination, the tape retraction system selectively modifies the tension in the spiral spring. For example, if the retraction speed is at or approaching a threshold speed, the tape retraction system interfaces with the spiral spring to reduce the retraction speed such as by reducing the tension in the spiral spring that biases the tape blade into the housing. In another example, the acceleration of the markings is measured and compared to a threshold.

In another embodiment, optical detector 530 counts the markings 518 as they move past the optical detector 530 to determine the current state of tape measure 510. In one embodiment, the markings 518 can alternate in frequency/ distance such that the optical detector 530 can determine speed as well as direction that tape blade 520 is moving past optical detector 530.

In another embodiment, a rotating component in tape measure 510, such as tape reel 14, includes a series of radially-arranged markings that are monitored by the sensor (s). The sensor identifies when each marking moves past the sensor and based on that identification the retraction system determines how much of the tape blade spool is extracted from the tape measure housing. Based on that determination, the tape retraction system selectively modifies the tension in the spiral spring. It is contemplated herein that any rotating component (e.g., the arbor, the spiral spring) may include or define radially-arranged markings.

In another embodiment, the rotational speed can be converted into a linear speed of the tape blade 520 by taking into consideration the amount of tape blade 520 that has already been paid out (e.g., determining the outer radius of the tape blade 520 that is still coiled on the tape reel 14).

Other methods of speed detection include magnetic/Hall-effect sensors. One or more magnets can be placed on the tape reel, and one or more Hall-effect sensors can determine the number of rotations, the speed of rotation, etc. of the tape reel. Another method includes a device that operates similar to a governor on an engine. As the device rotates faster, the spring-loaded arms are forced outward by centrifugal forces. The further out that the arms are, the faster that the device is spinning.

In one embodiment, the one or more sensors are rotated with respect to the housing 12 (e.g., the sensor(s) are disposed on the tape reel). The sensor(s) monitor radially-arranged markings, such as on the housing, to determine the status (e.g., the torque) of tape measure 10. In another embodiment the sensor(s) monitor radially-arranged markings on another component that is rotating with respect to the housing (e.g., the sensor(s) are on the tape reel monitor markings on the arbor, which rotates with respect to the tape reel as the tape blade is extracted from or retrieved into the housing).

Referring to FIGS. 20-23, various aspects of tape measure 610 are shown. Tape measure 610 is similar to the other tape measures described herein except for the differences noted. Clutch 626 is between arbor 618 and motor shaft 632 to manage an amount of tension in spring 16.

Clutch 626 includes torque moderating component, shown as wheels 622, that interface against plate 634. Plate 634 circumferentially define multiple peaks 630 and valleys 628. In a specific embodiment peaks 630. At a position of no torque and/or low tension in spring 16, spring 636 biases wheels 622 towards valleys 628. As tension is exerted on spring 16 (e.g., as tape blade 20 is withdrawn from housing 12), torque on arbor 618 rotates with respect to plate 634, and as a result wheels 622 circumferentially move with respect to plate 634 at least partially from valleys 628 to peaks 630.

Figure 24:
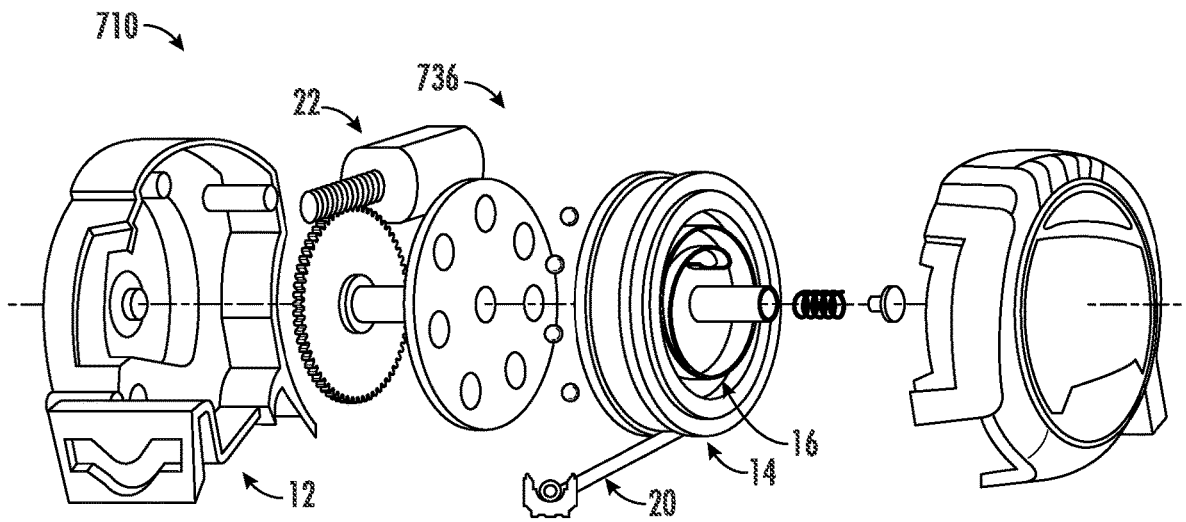
FIG. 24 is an exploded view of a tape measure, according to an embodiment.

Referring to FIG. 24, various aspects of tape measure 710 are shown that includes an innovative clutch 736. Referring to FIG. 24, a motorized/hybrid tape measure 710 includes an electric motor 22, clutch 736 and a spiral spring 16. An electric motor 22 drives a worm drive system. The worm drive system converts the rotational movement of the drive shaft into orthogonal rotational movement with a gear reduction. The worm drive gear reduction is optimized based on speed needed to rotate the spring arbor, the voltage and speed of the motor, and the brake force of the motor needed to maintain the spring arbor stationary when the motor is not powered, among other factors.

Between the worm drive system and the spring arbor is a clutch 736. The clutch 736 can be a detent or slip clutch. Shown in this image is a detent clutch. The clutch 736 prevents the motor from over driving or over torqueing the spring arbor. The clutch plates are pressed together by the tensioner spring. The stronger the compressive force of the spring, the higher the torque limit before the clutch slips. The amount of force applied to the clutch plates can be adjusted via the clutch adjustment screw. Attached to the spring arbor is one end of the spring. The other end of the spring is attached to the blade spool, which can be co-axial to and surround the spring.

Still referring to FIG. 24, the motor is used to adjust the amount of torque that the spring applies to the blade spool. As the user pulls out the blade 20 from the housing 12, the spring 16 winds up and, if the user continues to pull out the blade 20, the spring 16 winds to a pre-set torque limit, and the motor is used to adjust the spring arbor to unwind the spring such that the spring applies less than the pre-set toque limit. Similarly, once the user allows the blade to wind back up into the housing, the spring unwinds to another pre-set torque limit, and the motor is used to adjust the spring arbor to wind the spring such that the spring can continue to apply enough torque to the blade spool to completely reel the blade in. Accordingly, in such embodiments, torque is measured. Two options for measuring torque are (i) at the main spring and (ii) between the motor and the arbor.

To perform these measurements, tape measure 10 may include one or more sensors to detect a state of tape measure 710. Based on measurement(s) from the one or more sensors, a control signal for the motor is generated.

The motor interfaces with the retraction system based at least in part on the control signal. For example, in FIG. 24 the motor interfaces with the tape spool. However, it is contemplated herein that the motor interfaces with any of one or more components in the retraction system (e.g., the tape spool, the elongate tape blade, the arbor).

In various embodiments, the clutch system described herein is used in combination with the one or more embodiments with sensors also described herein.

In one embodiment, when the elongate tape blade is fully retracted within the housing, tape measure's spiral spring is in a low/no torque state. In this position, the total distance of the arbor and motor shaft is at its shortest. As the elongate tape blade is extracted from the housing, the arbor rotates with respect to the motor shaft and the total distance of the arbor and motor shaft increases. One or more sensors monitor the distance of motor shaft and arbor, and based on the measurement(s) the system infers the current positioning of the elongate tape (e.g., fully retracted within the housing, fully extended out of the housing, an intermediate state between fully retracted and fully extended).

In one embodiment, motor shaft is rotatably coupled to three rollers, which each interface within a valley (e.g., a recessed portion between a pair of extended portions). It is contemplated herein that any number of rollers and valleys may be used, including switching which axle is coupled to the rollers and which axle includes the cammed surface.

It is contemplated herein that any aspect of the motor shaft and arbor interface may be measured, such as an orientation of the arbor with respect to the motor shaft, a distance between the arbor and the housing (if the arbor is permitted to longitudinally slide along its axis rather than the motor shaft), and/or a distance between the housing and at least one of the arbor or housing.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
a housing;
a tape reel rotatably mounted within the housing;
a rotational axis defined by the tape reel around which the tape reel rotates;
an elongate tape blade wound around the tape reel;
a spiral spring coupled to the tape reel, wherein when the elongate tape blade is unwound from the tape reel to extend from the housing the spiral spring stores energy, wherein the spiral spring releasing energy drives rewinding of the elongate tape blade on to the tape reel; and
a sensor that measures a speed of the elongate tape blade being extended from or retrieved into the housing.

2. The tape measure of claim 1, wherein the sensor generates a first signal as a result of measuring the speed of the elongate tape blade, wherein a configuration of the spiral spring is determined based on the first signal.

3. The tape measure of claim 2, the tape measure further comprises a motor that adjusts an amount of tension in the spiral spring in response to receiving the first signal.

4. The tape measure of claim 1, wherein the sensor detects indicia on a bottom surface of elongate tape blade.

5. The tape measure of claim 4, wherein the sensor is an optical detector.

6. The tape measure of claim 4, wherein the indicia is an alternating stripe pattern.

7. The tape measure of claim 4, wherein the sensor detects a speed of the indicia moving past the sensor.

8. The tape measure of claim 7, wherein the sensor generates a first signal as a result of measuring the speed of the indicia of the elongate tape blade and a configuration of the spiral spring is determined based on the first signal, and wherein the tape measure further comprises a motor that adjusts an amount of tension in the spiral spring in response to receiving the first signal.

9. The tape measure of claim 1, wherein the sensor is positioned within the housing proximate to where the elongate tape blade exits the housing.

10. A tape measure comprising:
a housing;
a tape reel rotatably mounted within the housing;
a rotational axis defined by the tape reel around which the tape reel rotates;
an elongate tape blade wound around the tape reel;
a spiral spring coupled to the tape reel, wherein when the elongate tape blade is unwound from the tape reel to extend from the housing the spiral spring stores energy, wherein the spiral spring releasing energy drives rewinding of the elongate tape blade on to the tape reel; and
a sensor that measures at least one of a length of the elongate tape blade extended from and a length of the elongate tape retrieved into the housing.

11. The tape measure of claim 10, wherein the sensor generates a first signal as a result of measuring the length of the elongate tape blade extended from the housing, wherein a configuration of the spiral spring is determined based on the first signal.

12. The tape measure of claim 11, the tape measure further comprises a motor that adjusts an amount of tension in the spiral spring in response to receiving the first signal.

13. The tape measure of claim 10, wherein the sensor detects markings on a bottom surface of elongate tape blade.

14. The tape measure of claim 13, wherein the sensor determines the length of the elongate tape blade extended from housing by counting the markings on the elongate tape blade moving past the sensor.

15. A tape measure comprising:
a housing;
a tape reel rotatably mounted within the housing;
a rotational axis defined by the tape reel around which the tape reel rotates;
an elongate tape blade wound around the tape reel;
a spiral spring located within the housing, wherein when the elongate tape blade is unwound from the tape reel to extend from the housing the spiral spring stores energy, wherein the spiral spring releasing energy drives rewinding of the elongate tape blade on to the tape reel;
a motor that interfaces with the tape reel via a clutch, the clutch positioned between the motor and the tape reel; and
a sensor that measures a tension of the spiral spring.

16. The tape measure of claim 15, wherein the sensor generates a first signal as a result of measuring the tension of the spiral spring, wherein a configuration of the spiral spring is determined based on the first signal.

17. The tape measure of claim 16, wherein the motor adjusts an amount of tension in the spiral spring in response to receiving the first signal.

18. The tape measure of claim 15, wherein the clutch defines a maximum tension in the spiral spring such that when the maximum tension is reached the clutch slips preventing an increase in the tension.

19. The tape measure of claim 18, wherein the clutch includes an adjustment mechanism such that the maximum tension is adjustable.

20. The tape measure of claim 15, wherein the clutch is a detent clutch.

* * * * *